(12) United States Patent
Rimas Ribikauskas et al.

(10) Patent No.: US 9,417,701 B2
(45) Date of Patent: Aug. 16, 2016

(54) FLICK GESTURE

(75) Inventors: Emily K. Rimas Ribikauskas, Seattle, WA (US); Jeffrey W. Pettiross, Seattle, WA (US); Leroy Bertrand Keely, Jr., Portola Valley, CA (US); Matthew R Lerner, Seattle, WA (US); Robert J. Jarrett, Snohomish, WA (US); Sriram Viji, Seattle, WA (US); Rick Duncan, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 20 days.

(21) Appl. No.: 12/814,094

(22) Filed: Jun. 11, 2010

(65) Prior Publication Data

US 2010/0251116 A1 Sep. 30, 2010

Related U.S. Application Data

(63) Continuation of application No. 10/938,882, filed on Sep. 13, 2004, now Pat. No. 7,761,814.

(51) Int. Cl.
  *G06F 3/033* (2013.01)
  *G06F 3/01* (2006.01)
  *G06F 3/0488* (2013.01)
(52) U.S. Cl.
  CPC ............ *G06F 3/017* (2013.01); *G06F 3/04883* (2013.01); *G06F 2203/04807* (2013.01)
(58) Field of Classification Search
  USPC .......................................... 715/702, 856, 863
  See application file for complete search history.

(56) References Cited

U.S. PATENT DOCUMENTS

| | | | |
|---|---|---|---|
| 4,727,588 A | | 2/1988 | Fox et al. |
| 5,220,649 A | * | 6/1993 | Forcier .................. G06F 3/0488 715/273 |
| 5,347,295 A | | 9/1994 | Agulnick et al. |
| 5,428,805 A | | 6/1995 | Morgan |
| 5,495,566 A | * | 2/1996 | Kwatinetz ............. G06F 3/0485 345/684 |
| 5,511,135 A | | 4/1996 | Rhyne et al. |
| 5,570,113 A | * | 10/1996 | Zetts .................. G06F 3/04883 345/156 |
| 5,689,667 A | | 11/1997 | Kurtenbach |
| 5,694,150 A | | 12/1997 | Sigona et al. |
| 5,717,939 A | | 2/1998 | Bricklin et al. |
| 5,730,602 A | | 3/1998 | Gierhart et al. |
| 5,768,418 A | | 6/1998 | Berman et al. |
| 5,862,256 A | | 1/1999 | Zetts et al. |

(Continued)

FOREIGN PATENT DOCUMENTS

| | | |
|---|---|---|
| CN | 1155876 | 6/2006 |
| EP | 1335272 | 8/2003 |

(Continued)

OTHER PUBLICATIONS

Japanese Office Action mailed Jun. 21, 2011 for Japanese Patent Application No. 2005-263907, a counterpart foreign application of U.S. Appl. No. 7,761,814, 5 pages.

(Continued)

*Primary Examiner* — Hua Lu
(74) *Attorney, Agent, or Firm* — Judy Yee; Micky Minhas; Lee & Hayes, PLLC

(57) ABSTRACT

A system and method for determining whether a flick gesture has occurred is described. A flick gesture is a simple gesture that may be easily detected and is characterized by minimal interference with other applications or gestures.

20 Claims, 6 Drawing Sheets

(56) References Cited

U.S. PATENT DOCUMENTS

| | | | |
|---|---|---|---|
| 5,874,936 A * | 2/1999 | Berstis | G06F 3/0481 715/785 |
| 5,929,840 A * | 7/1999 | Brewer | G06F 3/04812 345/157 |
| 6,057,845 A * | 5/2000 | Dupouy | G06F 3/04883 382/186 |
| 6,094,197 A * | 7/2000 | Buxton | G06F 3/0482 341/22 |
| 6,104,317 A | 8/2000 | Panagrossi | |
| 6,249,606 B1 | 6/2001 | Kiraly et al. | |
| 6,268,857 B1 * | 7/2001 | Fishkin | G06F 1/16 345/156 |
| 6,340,967 B1 | 1/2002 | Maxted | |
| 6,888,536 B2 * | 5/2005 | Westerman | G06F 3/0235 345/156 |
| 7,173,637 B1 * | 2/2007 | Hinckley | G06F 3/0362 345/684 |
| 7,218,781 B2 * | 5/2007 | van Meurs | G06K 9/222 341/28 |
| 2001/0036619 A1 | 11/2001 | Kerwin | |
| 2002/0015064 A1 * | 2/2002 | Robotham | G06F 3/0481 715/863 |
| 2002/0056575 A1 * | 5/2002 | Keely | G06F 1/1626 178/18.01 |
| 2002/0130839 A1 | 9/2002 | Wallace et al. | |
| 2002/0180797 A1 * | 12/2002 | Bachmann | G06F 3/0236 715/780 |
| 2003/0156145 A1 * | 8/2003 | Hullender | G06F 3/04883 715/863 |
| 2003/0177286 A1 | 9/2003 | Gould | |
| 2004/0027385 A1 * | 2/2004 | Rekimoto | H04B 13/005 715/773 |
| 2004/0189720 A1 | 9/2004 | Wilson et al. | |
| 2004/0193413 A1 | 9/2004 | Wilson et al. | |
| 2004/0218104 A1 * | 11/2004 | Smith et al. | 348/734 |
| 2005/0088420 A1 | 4/2005 | Dodge et al. | |
| 2005/0210418 A1 | 9/2005 | Marvit et al. | |
| 2006/0001656 A1 | 1/2006 | LaViola et al. | |
| 2006/0031786 A1 * | 2/2006 | Hillis | G06F 3/04883 715/863 |
| 2008/0036743 A1 | 2/2008 | Westerman et al. | |

FOREIGN PATENT DOCUMENTS

| | | |
|---|---|---|
| JP | 6131110 A | 5/1994 |
| JP | 8016314 A | 1/1996 |
| JP | 8286807 A | 11/1996 |
| JP | 9237149 A | 9/1997 |
| JP | 10069344 A | 3/1998 |
| JP | 10083245 A | 3/1998 |
| JP | H11507455 A | 6/1999 |
| JP | 2000137571 A | 5/2000 |
| JP | 2001117686 A | 4/2001 |
| JP | 2001202174 A | 7/2001 |
| JP | 2003233452 A | 8/2003 |
| JP | 2003308482 A | 10/2003 |
| JP | 2004206731 A | 7/2004 |
| KR | 100553671 | 1/2000 |
| KR | 100902740 | 1/2004 |

OTHER PUBLICATIONS

Dulberg, et al., "An Imprecise mouse gesture for the fast activation of controls", in Interact '99. 375-382. Retrieved online on Jun. 6, 2007 <http://citeseer.ist.psu.edu/dulberg99imprecise.html>.

Fishkin, et al., "Embodied User Interfaces for Really Direct Manipulation", ACM Version 9 (Jul. 3, 1999), pp. 1-11.

Internet Printout: Use marking menus, <<http://www.alias.com/eng/support/studiotools/documentation/Using/Interface11html>>, Sep. 8, 2004.

Meyer, Pen Computing a Technology Overview and a Vision, vol. 27, No. 3, Jul. 1995, pp. 45.

Minsky, "Manipulating Simulated Objects with Real-world Gestures Using a Force and Position Sensitive Screen", ACM, vol. 18, No. 3, Jul. 1984, pp. 195-203.

Moyle, et al., "A Flick in the Right Direction: An Evaluation of Simple Gesture Based Controls", University of Canterbury, Nov. 2, 2001, pp. 1-43.

Moyle, et al., "Gesture Navigation: An Alternate 'Back' for the Future", CHI 2002, Apr. 20-25, 2002, pp. 2.

Moyle, et al., "The Design and Evaluation of a Flick Gesture for 'Back' and Forward in web Browsers", Human—Computer Interaction Lab, Department of Computer Science, 2003, pp. 8.

Shrinath Shanbhag, et al., "An Intelligent Multi-layered Input Scheme for Phonetic Scripts", ACM 2002, pp. 35-38.

Venolia, et al., "T-Cube: A Fast, Self- Disclosing Pen- Based Alphabet", ACM 1994, pp. 265-270.

Wanted Features for Berlin, Wanted Features for Berlin for the Warsaw and Moscow APIs, modifed Apr. 14, 1990, printed from ANOQ of the Sun homepage on Sep. 1, 2004, pp. 4.

Wu, et al., "Multi-Finger and Whole Hand Gestural Interaction Techniques for Multi-User Tabletop Displays", ACM, 2003, pp. 193-202.

Korean Office Action mailed Jan. 18, 2012 for Korean patent application No. 10-2005-85347, a counterpart foreign application of U.S. Pat. No. 7,761,814, 5 pages.

Japanese Office Action mailed May 28, 2013 for Japan patent application No. 2011-232054, a counterpart foreign application of U.S. Pat. No. 7,761,814, 10 pages.

European Office Action mailed Oct. 16, 2014 for European patent application No. 05108158.6, a counterpart foreign application of U.S. Appl. No. 10/938,882, 4 pages.

* cited by examiner

FLICK GESTURE

RELATED APPLICATION INFORMATION

This application is a continuation of, and claims priority to, U.S. patent application Ser. No. 10/938,882, filed Sep. 13, 2004, issued as U.S. Pat. No. 7,761,814, listing Emily Rimas-Ribikauskas, Rob Jarrett, Jeff Pettiross, Matthew Lerner, Leroy B. Keely, Rick Duncan, and Sriram Viji as inventors, the contents of which are expressly incorporated herein by reference.

BACKGROUND OF THE INVENTION

1. Field of the Invention

Aspects of the present invention relate to computing systems. More particularly, aspects of the present invention relate to a process for determining when a hand-written gesture has occurred.

2. Description of Related Art

Computing systems accept a variety of inputs. Some computer applications accept gestures formed by pointing devices to enable easier control and navigation of the applications. The difficulty however with conventional gesture recognizers is that they provide too many false positives and false negatives. When a user is using a pointing device (for instance, a stylus or finger with a stylus-based computer or a mouse), a system may interpret normal actions from the pointing device as gestures and implement the functions associated with the gestures to the bewilderment of the user. Likewise, a user may become frustrated when trying to perform a gesture and the computing system not recognizing the user's effort as a gesture. In some cases, gestures are relegated to a separate operation where a user is forced to change a mode of a system before a gesture may be recognized. For instance, the Opera browser (by Opera Software ASA of Oslo, Norway) permits mouse gestures to be used to control the browser's operation. Similar mouse gestures are available through plug-ins with the Firefox browser (by the Mozilla Organization, Mountain View, Calif.). While these browsers recognize gestures, the user is required to switch operating modes of the browsers in order to explicitly notify the browsers that gestures are to be performed. In both the Opera and Firefox browsers, the operating mode is switched by the user clicking on a right (or auxiliary) mouse button prior to performing the gesture. The issue here is that multiple steps have to be performed in order to complete all gestures, namely press a right mouse button and then drag the mouse. When using a stylus, these browsers require the stylus to enter an alternative input mode, namely pressing a stylus button (if the stylus has a stylus button). These multiple steps make gestures cumbersome. Further, while these browsers may recognize a gesture composed of a straight line while depressing a mouse or stylus button, gestures acceptable on browsers are generally not usable in more environments because they would generate too many false positives when applied to non-read only environments (for instance, a word processing environment).

In computer systems or computer applications that recognize and assign functions to gestures, shape alone is generally used to determine whether or not a gesture has occurred. An issue with using shape alone is that slow stylus or mouse-wielding users may have a tendency to perform actions that may be recognized as gestures, despite the intentions of the users to the contrary.

Marking menus (also referred to as radial menus) are menus that may be accessed through interaction with a pointing device. Maya and Alias applications of Alias Systems Corp. of Toronto, Ontario, Canada provide examples of marking menus. While similar to gestures in that they include start and stop locations, marking menus are considered menus in that the relevant part of the user input is the location of a button up or stylus up event, not the shape of the actual path to the location.

An improved gesture is needed that is easily recognized by a gesture recognizer yet easy to perform by a user.

BRIEF SUMMARY OF THE INVENTION

Aspects of the present invention address one or more of the problems described above, thereby providing a process for robustly recognizing gestures.

BRIEF DESCRIPTION OF THE DRAWINGS

The present invention is illustrated by way of example and not limited in the accompanying figures in which like reference numerals indicate similar elements and in which.

DETAILED DESCRIPTION OF THE INVENTION

Figure 1:
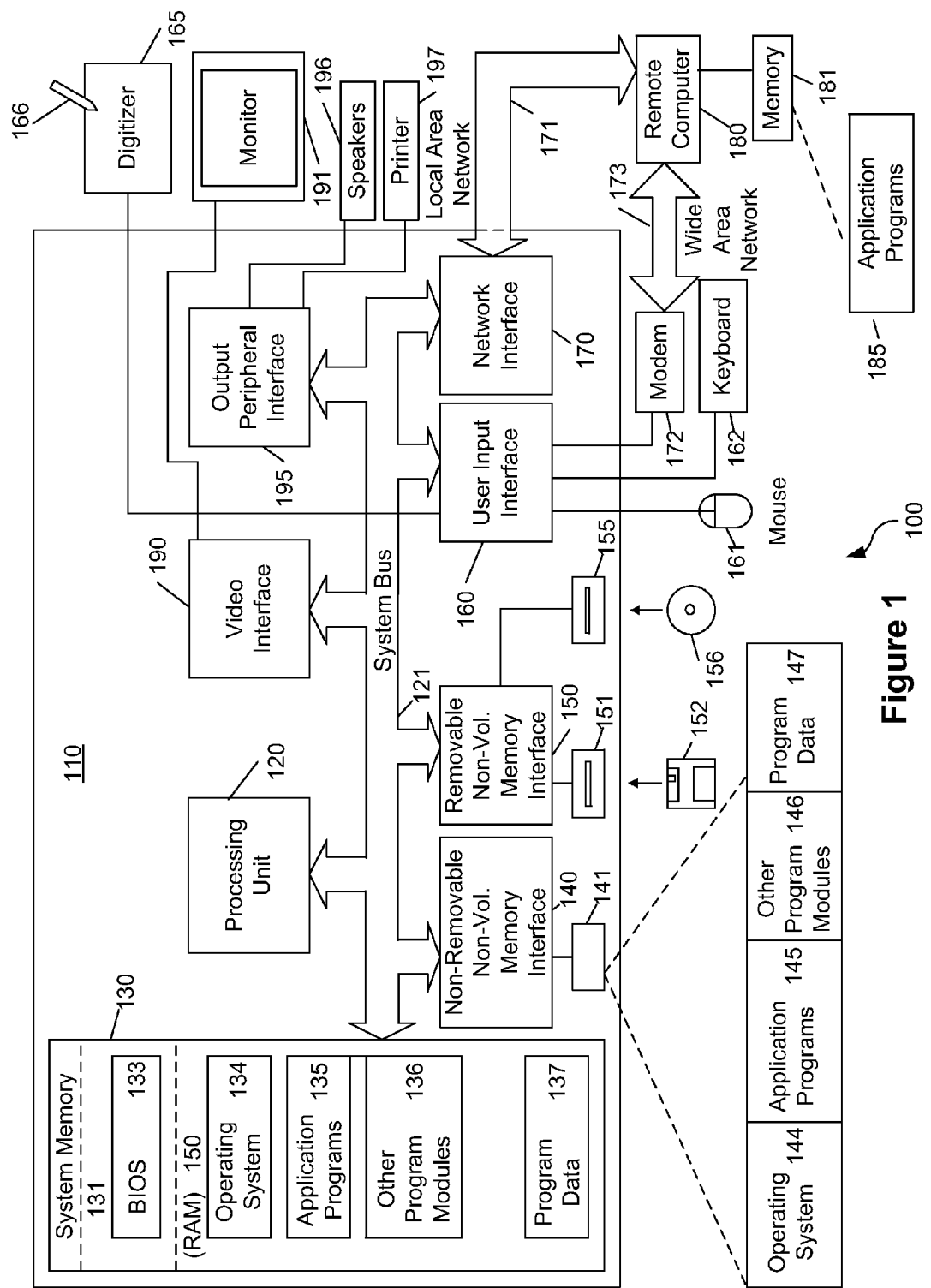
FIG. 1 shows an illustrative example of a general-purpose computing environment in accordance with aspects of the present invention.

Aspects of the present invention relate to recognizing a flick gesture.

This document is divided into sections to assist the reader. These sections include: characteristics of ink, terms, general-purpose computing environment, gestures, a flick gesture, flick gesture determination, training, and illustrative implementations.

It is noted that various connections are set forth between elements in the following description. It is noted that these connections in general and, unless specified otherwise, may be direct or indirect and that this specification is not intended to be limiting in this respect.

Characteristics of Ink

As known to users who use ink pens, physical ink (the kind laid down on paper using a pen with an ink reservoir) may convey more information than a series of coordinates connected by line segments. For example, physical ink can reflect pen pressure (by the thickness of the ink), pen angle (by the shape of the line or curve segments and the behavior of the ink around discreet points), and the speed of the nib of the pen (by the straightness, line width, and line width changes over the course of a line or curve). Further examples include the way ink is absorbed into the fibers of paper or other surface it is deposited on. These subtle characteristics also aid in conveying the above listed properties. Because of these additional properties, emotion, personality, emphasis and so forth can be more instantaneously conveyed than with uniform line width between points.

Electronic ink (or ink) relates to the capture and display of electronic information captured when a user uses a stylus-based input device. Electronic ink refers to a sequence or any arbitrary collection of strokes, where each stroke is comprised of a sequence of points. The strokes may have been drawn or collected at the same time or may have been drawn or collected at independent times and locations and for independent reasons. The points may be represented using a variety of known techniques including Cartesian coordinates (X, Y), polar coordinates (r, Θ), and other techniques as known in the art. Electronic ink may include representations of properties of real ink including pressure, angle, speed, color, stylus size, and ink opacity. Electronic ink may further include other properties including the order of how ink was deposited on a page (a raster pattern of left to right then down for most western languages), a timestamp (indicating when the ink was deposited), indication of the author of the ink, and the originating device (at least one of an identification of a machine upon which the ink was drawn or an identification of the pen used to deposit the ink) among other information.

Terms

Ink A sequence or set of strokes with properties. A sequence of strokes may include strokes in an ordered form. The sequence may be ordered by the time captured or by where the strokes appear on a page or in collaborative situations by the author of the ink. Other orders are possible. A set of strokes may include sequences of strokes or unordered strokes or any combination thereof. Further, some properties may be unique to each stroke or point in the stroke (for example, pressure, speed, angle, and the like). These properties may be stored at the stroke or point level, and not at the ink level Ink object A data structure storing ink with or without properties.

Stroke A sequence or set of captured points. For example, when rendered, the sequence of points may be connected with lines. Alternatively, the stroke may be represented as a point and a vector in the direction of the next point. In short, a stroke is intended to encompass any representation of points or segments relating to ink, irrespective of the underlying representation of points and/or what connects the points.

Point Information defining a location in space. For example, the points may be defined relative to a capturing space (for example, points on a digitizer), a virtual ink space (the coordinates in a space into which captured ink is placed), and/or display space (the points or pixels of a display device).

Document Any electronic file that has a viewable representation and content. A document may include a web page, a word processing document, a note page or pad, a spreadsheet, a visual presentation, a database record, image files, and combinations thereof.

Flick A short, quick, straight movement of a pointing device of a computer system. Where the pointing device is a stylus or finger, the flick may occur on the surface of the stylus-enabled computer or may occur above its surface. Where the pointing device is a mouse, the movement may occur with a mouse button being held down or without a mouse button being held down. The flick may create a stroke as defined above. It is noted that strokes may be created by other activities as well including but not limited to drawing or inking with a pointing device. An advantage of using a stylus to perform a flick gesture is that it permits one to use flick gestures in combination with pen-enabled computers (using active pens and static pens). An advantage of using a mouse to perform a flick gesture is that a mouse is easy to use and commonly found with most computers. An advantage of using a finger to perform a flick gesture is that some users prefer using a finger as compared to a stylus on pen-based computers—allowing users to use their finger to perform flicks provides them the functionality of a flick without using additional hardware.

General-Purpose Computing Environment

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, and removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In some aspects, a pen digitizer 165 and accompanying pen or stylus 166 are provided in order to digitally capture freehand input. Although a direct connection between the pen digitizer 165 and the user input interface 160 is shown, in practice, the pen digitizer 165 may be coupled to the processing unit 110 directly, parallel port or other interface and the system bus 130 by any technique including wirelessly. Also, the pen 166 may have a camera associated with it and a transceiver for wirelessly transmitting image information captured by the camera to an interface interacting with bus 130. Further, the pen may have other sensing systems in addition to or in place of the camera for determining strokes of electronic ink including accelerometers, magnetometers, and gyroscopes.

It will be appreciated that the network connections shown are illustrative and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
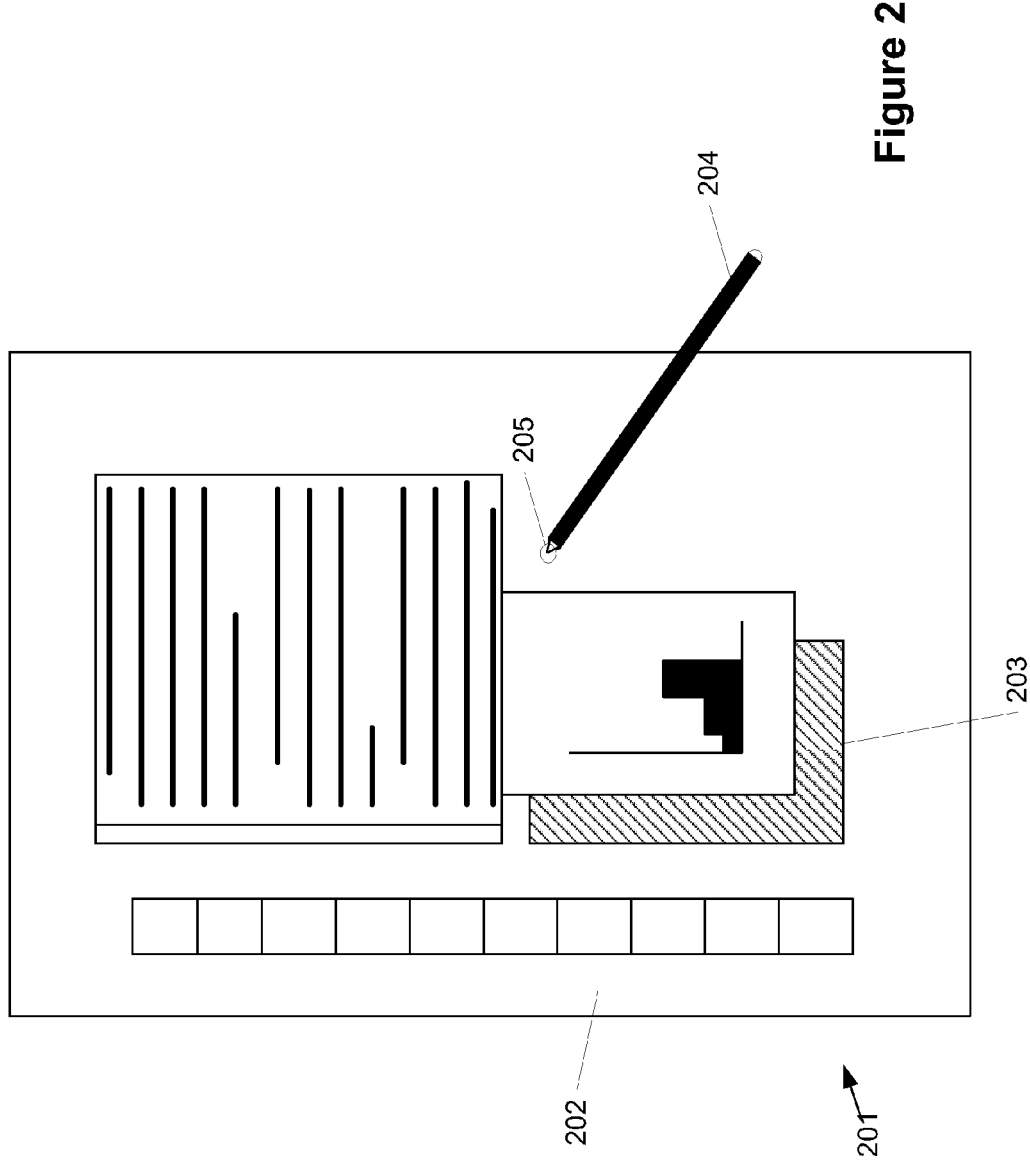
FIG. 2 shows an illustrative example of a tablet computer in accordance with aspects of the present invention.

FIG. 2 illustrates an illustrative tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and/or write on the digitizing display surface 202. Examples of suitable digitizing display surfaces 202 include electromagnetic pen digitizers, such as Mutoh or Wacom pen digitizers. Other types of pen digitizers, e.g., optical digitizers, may also be used. Tablet PC 201 interprets gestures made using stylus 204 in order to manipulate data, enter text, create drawings, and/or execute conventional computer application tasks such as spreadsheets, word processing programs, and the like.

The stylus 204 may be equipped with one or more buttons or other features to augment its selection capabilities. In one embodiment, the stylus 204 could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be the stylus 204 and used for selecting or indicating portions of the displayed image on a touch-sensitive or proximity-sensitive display. Consequently, the term "user input device", as used herein, is intended to have a broad definition and encompasses many variations on well-known input devices such as stylus 204. Region 205 shows a feedback region or contact region permitting the user to determine where the stylus 204 as contacted the display surface 202.

In various embodiments, the system provides an ink platform as a set of COM (component object model) services that an application can use to capture, manipulate, and store ink. One service enables an application to read and write ink using the disclosed representations of ink. The ink platform may also include a mark-up language including a language like the extensible markup language (XML). Further, the system may use DCOM as another implementation. Yet further implementations may be used including the Win32 programming model and the .Net programming model from Microsoft Corporation.

Gestures

Gestures are ways to invoke an action, similar to clicking a toolbar button or typing a keyboard shortcut. Gestures may be performed with a pointing device (including but not limited to a mouse, stylus, and/or finger). A gesture has a shape associated with it. The shape may be as simple as a point (clicking a mouse button for instance) or as complicated as a series of movements. The gesture also has a position associated with it as well. The position may be used to dictate the scope, target, and/or meaning of the gesture.

A Flick Gesture

Gestures have been used in computing systems for years. However, many developers and end-users disable gestures because of difficulties and complexities created by gestures. For instance, gesture recognition engines suffer from an unacceptably high number of false positives and false negatives when recognizing gestures. These false positives (where a system determines a user input is a gesture when the user input was not intended as a gesture) and false negatives (where a system determines a user input not to be a gesture when a user has tried to perform a gesture) frustrate developers and end-users alike.

A flick gesture, as described herein, is a simple gesture that includes a single movement of a pointing device. A flick gesture is easy for the user to remember and perform. Once a user has mastered a flick gesture, it can be applied in multiple directions to accomplish different tasks. Also, a flick gesture is easy for the system to recognize and discriminate against other actions (including drag, selection, etc.)

A developer and/or user may associate operations with the flick gesture. These operations may include navigation forward, backward, scrolling up or down, changing applications, right click (which may or may not always be present in a stylus-based system), and arbitrary application commands. Arbitrary application commands are commands pertinent to applications that are specific to those applications and not generally usable across other applications. Further, a flick gesture does not need to have a predefined meaning but rather may be customizable by a developer or user to perform a key or key combination so that a user may have quick access to keyboard shortcuts or macros. One benefit of enabling gestures is that it allows users to feel more productive, to overcome feelings of being unproductive when not using a keyboard.

The flick gesture may be consistent in its associated function across all applications in an operating system. Alternatively, a flick gesture may be contextual in the function associated with it (where the resulting operation tied to the flick gesture varies based on an application in which the flick gesture occurred).

Also, flick gestures may be specific to locations in an application (for instance, in a title bar) or whether a selection has been made or not (for instance, the gesture may perform cut, copy, paste, and/or paste special operations). Additionally or alternatively, states of a computer may be used in determining which action associated with a flick gesture should be performed. For instance, a color of a currently selected object, which user is logged into the system, whether an external monitor is connected to the system, and the like—in short, any state or combination of states of a computing system or object—may be used to determine what action is to be performed in response to a flick gesture.

Further, different input devices may modify actions associated with flick gestures. For instance, a first set of actions may be associated with flick gestures when performed by a stylus. A second set of actions may be associated with flick gestures when performed by another pointing device. The number of sets of actions may be varied by the number of different input devices.

Further, hot zones may or may not be enabled where a flick in the hot zone may have yet another operation. Hot zones may include specific regions of a display and/or radial menus.

The flick gesture may be direction independent or may be direction specific. If direction specific, the direction the flick is drawn in will determine the outcome. The flick gesture characteristics may or may not vary based on direction. For instance, the system may have only one set of parameters for recognizing a flick gesture. Alternatively, the system may have any number of parameters that vary depending on the direction of the flick to accommodate left or right-handedness, angle of a stylus, and the like. These parameters may be modified to bias the ease of performing a flick gesture in certain directions.

Once the user learns how to perform flick gesture, she is only required to learn the actions linked to each of the available directions. The actions associated with each of the directions may be customizable allowing a user to have a personalized and optimized experience.

Flick gestures may be used alone. Alternatively, the flick gestures may be combined to perform additional actions. For instance, a flick gesture upwards may perform a page up action while two flick gestures both in the upwards direction may perform a move action that moves to the top of a document.

In alternative embodiments, flick gestures may be enabled through pressing a button on a stylus or by pressing a right mouse button (secondary mouse button) on a mouse while still satisfying any movement and time thresholds. However, one advantage of the flick gesture is that it may be performed with a left mouse button click or with a stylus or finger without changing modes. The flick gesture may increase a user's productivity and allows them to interact with their desktop and applications at a more effective level than was previously available. The gestures are designed such that a user has to do a minimal level of training/remembering in order to gain a significant benefit; once the gesture is mastered by a user they are only required to learn the direction-action association. Distinguishing between normal mouse or stylus movements and a flick gesture may be made based on a various criteria and constraints placed on the flick gesture.

Flick gestures may allow users to dispense with targeting scrollbars or navigation buttons. This may include reading documents or navigating documents with or without hyperlinks. Reading documents of this type may be performed online and offline. Additionally, common actions including cut, copy, and paste may be performed using flick gestures.

Flick Gesture Determination

A flick gesture can be performed by a user simply by flicking their pen against the screen; any active portion of the pen could be used, depending on the implementation (tip or bottom). Flick gestures may be performed in the natural mode without necessarily requiring the user to enter any modes— although a mode requirement may be made, for example, requiring the user to hold the pen button while performing a flick gesture. Flick gestures can be done in 8 directions (for instance), with each flick falls into one of the 8 directions. The occurrence of a flick gesture may be determined based on a profile of the physical or logical x and y co-ordinates and the pressure (or location) charted against time. In short, the three basic characteristics that may be used to determine whether a flick gesture has occurred include the direction of the flick, the movement of the flick, and the timing of the flick. The movement threshold may be, for example, greater than 1 cm and the time threshold greater than 0.2 ms. These values of course may be varied to accommodate all users. Using these characteristics, a system may calculate other aspects of a flick which may be more readily compared against thresholds. For instance, the system may calculate velocity, acceleration, curvature, lift, and the like and use these derived values or sets of values to determine if a user has performed a flick gesture.

Flick gestures may be determined apart from other actions including a double actuation (double tap or click), press and hold, hold and drag, and other gestures.

Other methods such as neural networks may also be used to attempt to classify flick gestures based on combinations of input characteristics derived from the three basic characteristics.

One of the benefits of using these criteria to determine whether a flick gesture has occurred is the minimization of false negatives and false positives while minimizing the detection time of the flick gestures. In combination, these benefits provide for overall improved system responsiveness. For instance, the procedure for determining whether a flick has occurred may be organized so as to quickly determine that a flick does not meet the qualifications for a flick gesture and permit the input device movement to be treated as a normal input device movement.

Aspects of the present invention may include rendering a flick movement and/or action associated with a normal input device action while the system is determining whether or not the flick is indeed a flick gesture. Alternatively, aspects of the present invention may include preventing input information (received from the user operating the pointing device) from being processed or rendered until the system determines whether or not a flick gesture has occurred. While this latter approach may cause a slight, visual delay in feedback to a user, it may improve the user's ability to perform flick gestures in the presence of objects that may be manipulated with a normal input. For instance, performing a flick over an object may be processed as a normal input, resulting in dragging and dropping the object, while a flick gesture may have been intended. Accordingly, these alternative aspects of the invention may hold the packets (that may or may not be a flick gesture) until the system determines whether they are a flick gesture or not.

Figure 3:
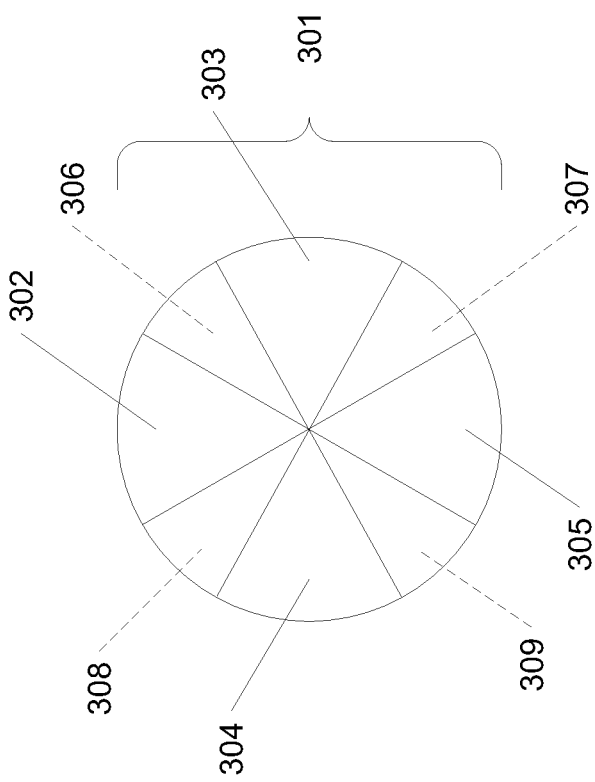
FIG. 3 shows various regions in which a flick gesture may be determined to have occurred in accordance with aspects of the present invention.

FIG. 3 shows the various illustrative directions that may be used for the flick gesture. The group of all directions is shown by region 301. Four Cardinal regions 302-305 are shown as well as four diagonal regions are shown 306-309. The system may treat all eight regions identical in respect to determination of which direction a flick gesture has traveled. Alternatively, some regions (for instance, the Cardinal directions) may be biased to classify a user's input as falling into one of these directions over the diagonal directions. The number of different directions may be fixed or modifiable. For instance, one may alternatively use 6 or 12 or any number of directions as the number of directions available to a user.

In order to determine the flick direction, the pen down point may represent the center of a circle, there may be 8 equally shaped and spaced regions surrounding the center, each a 45 degree section of the circle, for instance. These regions are not dependent on the orientation of the tablet, and rotate accordingly when tablet is rotated.

The regions do not need to be restricted to 45 degrees, and could be larger or smaller depending on the application. However, the ones used by default throughout the system may initially be set at 45 degrees.

A flick gesture, by definition, starts at the center of the circle shown in FIG. 3, as the pen down (or left mouse click) point is the center; and a short, quick, straight stroke, termed a flick, is drawn out for the pen down point. By definition of a flick, being short and straight, it will fall into one of the regions. Whichever region it is drawn in may determine the action which is fired. A flick region is determined by connecting the starting and ending points of the stroke which are in contact with the screen, provided the stroke meets a quality of a flick (which may or may not include the straightness, length and speed requirement as set forth herein). If the flick falls on the exact line which separates the regions, the flick may default to the regions non-diagonal region, or those representing the horizontal or vertical direction.

Upon successful recognition of a flick gesture, feedback may or may not be provided to a user, where the feedback indicates that the flick gesture a user has just performed has been recognized and that a message is being sent to the operating system or application. The feedback may also indicate the action that has been fired. This feedback does not mean that an action will take place, only that a successful flick has been recognized and is being sent. If, for example, a user continues to perform page down flick gestures once she has reached the bottom of the page, she will still get the correct feedback although no action will be resulting as they can scroll no further down the page.

This feedback may appear as soon as a successful gesture is recognized and will remain for a short period of time (in the vicinity of 500 ms), as which time it will disappear. Alternatively, no feedback may be provided. Further, in additional alternate aspects, the feedback may be animated to more readily inform a user that a successful flick gesture has been recognized. An animation may or may not provide the user with feedback of a direction associated with the recognized flick gesture.

Figure 4:
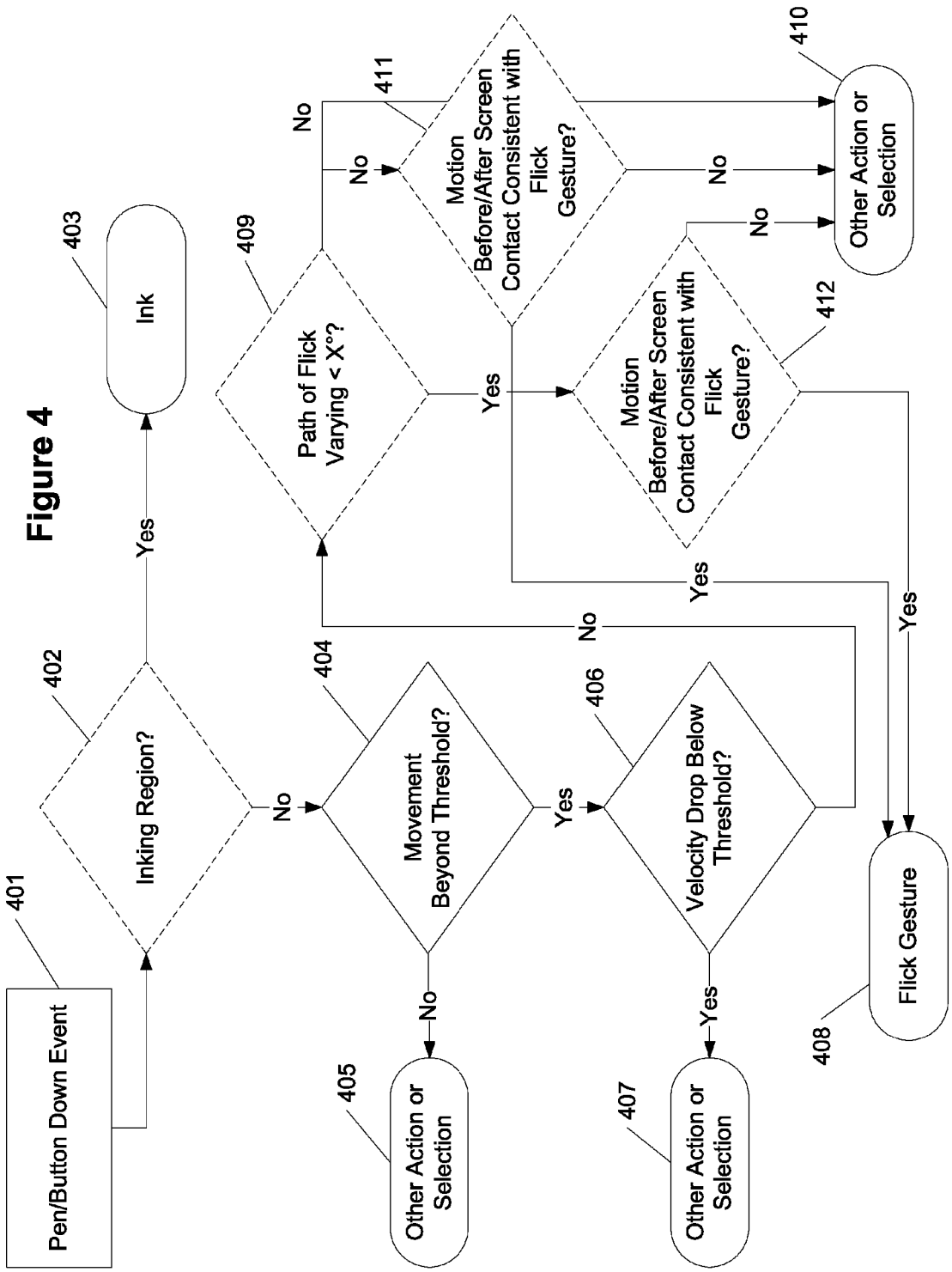
FIG. 4 shows processes for determining whether a flick gesture has occurred in accordance with aspects of the present invention.

FIG. 4 shows a procedure for determining if a flick has occurred. In step 401, a pen down or button down event occurs. Next in step 404, the system determines if there was movement beyond a movement threshold (for instance, beyond 0.2-0.5 cm). If no, then the system may determine that the input being received is some other action or selection as shown in step 405. If there was movement beyond the threshold from step 404, then the system determines if a velocity of the input device has dropped below a velocity threshold (for instance 20% or less of the highest velocity or 5 cm per second or less). The drop may or may not be sensitive for a drop in the velocity for brief interval (10-200 ms). Alternatively, the process may determine if the velocity of the received gesture is not decreasing.

If no from step 406, then another action or selection is determined in step 407. If yes from step 406, then a flick gesture is determined to have occurred in step 408. The current location may be considered to be any location along the path of the flick including but not limited to the location of the stylus or finger being lifted from a screen or mouse button being released.

The following describes optional additions to the process of FIG. 4. From step 401, the system may determine if a pen down location was in an inking region. If yes, then the system may believe the pen down event to relate to the creation of ink as shown in step 403. This may or may not include additional operations (for example actually creating ink, selecting, or erasing ink).

Another optional step includes step 409. In step 409, the system determines if the path of the possible flick gesture is relatively straight. This may include a determination of whether all points in the gesture lie within a predefined angle from an initial contact point. This initial angle may include 45° or less. If no, then the process may conclude that the input is not a flick gesture in step 410.

A further optional set of steps (411 and 412) includes analyzing the motion of the pointing device before and/or after it contacts the screen. For example, by noticing that a stylus continues in a straight line for some distance after the stylus tip or leaves the screen, one may further refine the precision of the detection algorithm. The approach of steps 409 and 412 help to quickly get rid of flicks that are not flick gestures. Alternatively, the approach of steps 409 and 411, while more complex and functionally slower (because this alternative approach may interpret flicks as flick gestures that had been rejected before), may be more tolerant of user movements.

Once a successful flick has taken place, the system may alert other aspects of the system or application that a flick gesture has occurred. A message may be sent such that an application can perform the associated behavior with that action, if there is no assigned behavior the flick architecture may send a default value for the application to interpret. For example, if a Back command is sent to an application, this may be interpreted as Back command in the browser, or as previous entry in a database application. More particularly, a variety of different approaches may be applied to handling flick gestures. First, a flick gesture may be interpreted by the operating system and handled there. The mapping from a given direction to the semantic may be performed by the system or may be omitted. Second, the mapping of the flick to a flick action may be made in the operating system but sent to the application or applications for handling. The system may communicate just the original direction of the flick (either by indicating a predefined region or the exact detected angle of the flick) to one or more applications programs, it may communicate the semantic, or communicate both. Third, the system may communicate the flick to an application or application where the application or applications interpret the flick as a flick gesture. The application program or programs may interpret the predefined region, exact angle, semantic message, or some combination of the three. The application or applications can then handle the flick gesture or send it back to the operating system for handling.

Flick gestures may apply at the pen down location of the flick or to the current focus, foreground application, or cursor location. Flick gestures are not limited to navigation but may be used to perform other operations as well. For instance, user may want to have a flick gesture perform a right-click operation at the location of a stylus contacting a screen.

Developers may be able to turn flick gestures off in their applications or in a specific area of their applications, such as scrollbars and the like. In addition, developers may be prevented from customizing flick gestures or, alternatively, may be able to customize flick gestures to take specific actions in their application. Further, flick gestures may or may not be enabled to provide custom feedback in applications as well.

Training

Figure 5:
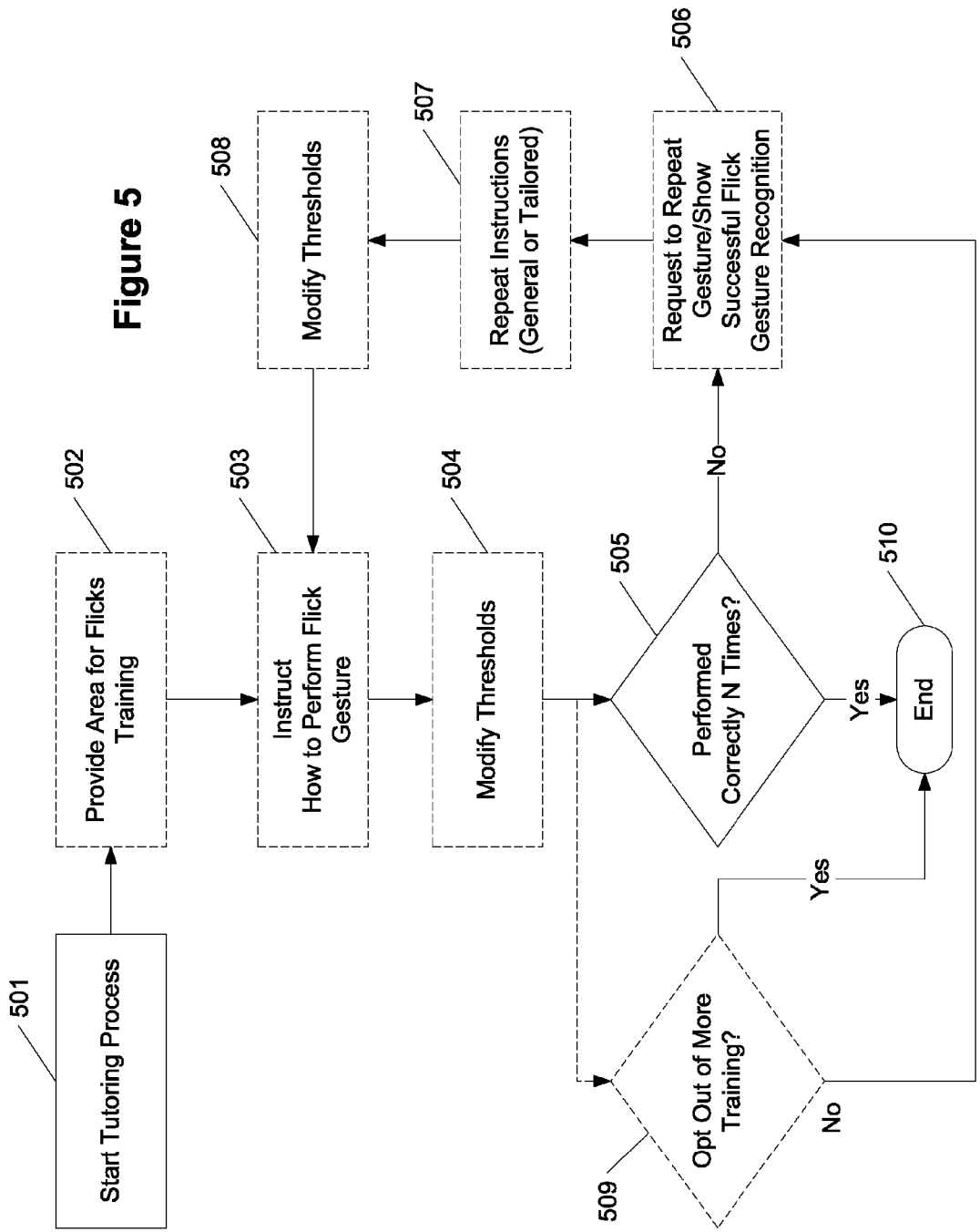
FIG. 5 shows an illustrative tutorial process for providing instruction to a user in accordance with aspects of the present invention.

FIG. 5 shows an illustrative process for training users to be able to perform a flick gesture. It is appreciated that any number of processes may be used to train users to perform flick gestures, of which a number of processes are shown in FIG. 5 with the direct and optional steps. Further, systems may implement flick gestures as described herein without providing training on how to perform flick gestures.

In step 501, the system begins a tutoring process. In step 505, the system determines if a user has performed a flick gesture N number of times (five or ten or so). If yes, then the system ends the tutorial process in step 510. If no from step 505, then the system requests more flick gestures in order to attempt to train the user. Alternatively, a user may be permitted to opt out from further training in step 509.

FIG. 5 also shows a number of additional optional components that may be included in training steps. In step 502, the system may provide an area where the user can practice flicks. In step 503, the system may instruct a user how to perform a flick gesture. In steps 504 and 508, the system may modify the thresholds of FIG. 4 to make flick gesture recognition easier or more closely model the actions a user is performing. In step 506, the system may request a user to repeat the gesture. Alternatively, or in addition to the request to repeat the gesture in step 506, the system may display an indication that the gesture was performed correctly. In step 507, the system may repeat instructions to a user on how to properly perform a flick gesture. The instructions may be general or may also include an explanation of specific improvements a user can make based on the previous attempt or attempts at performing a flick gesture. For instance, the process may indicate that the flick gesture was performed properly or provides them with a helpful tip to perform a flick successfully (e.g., flick faster or flick straighter, etc.).

Illustrative Implementations

Figure 6:
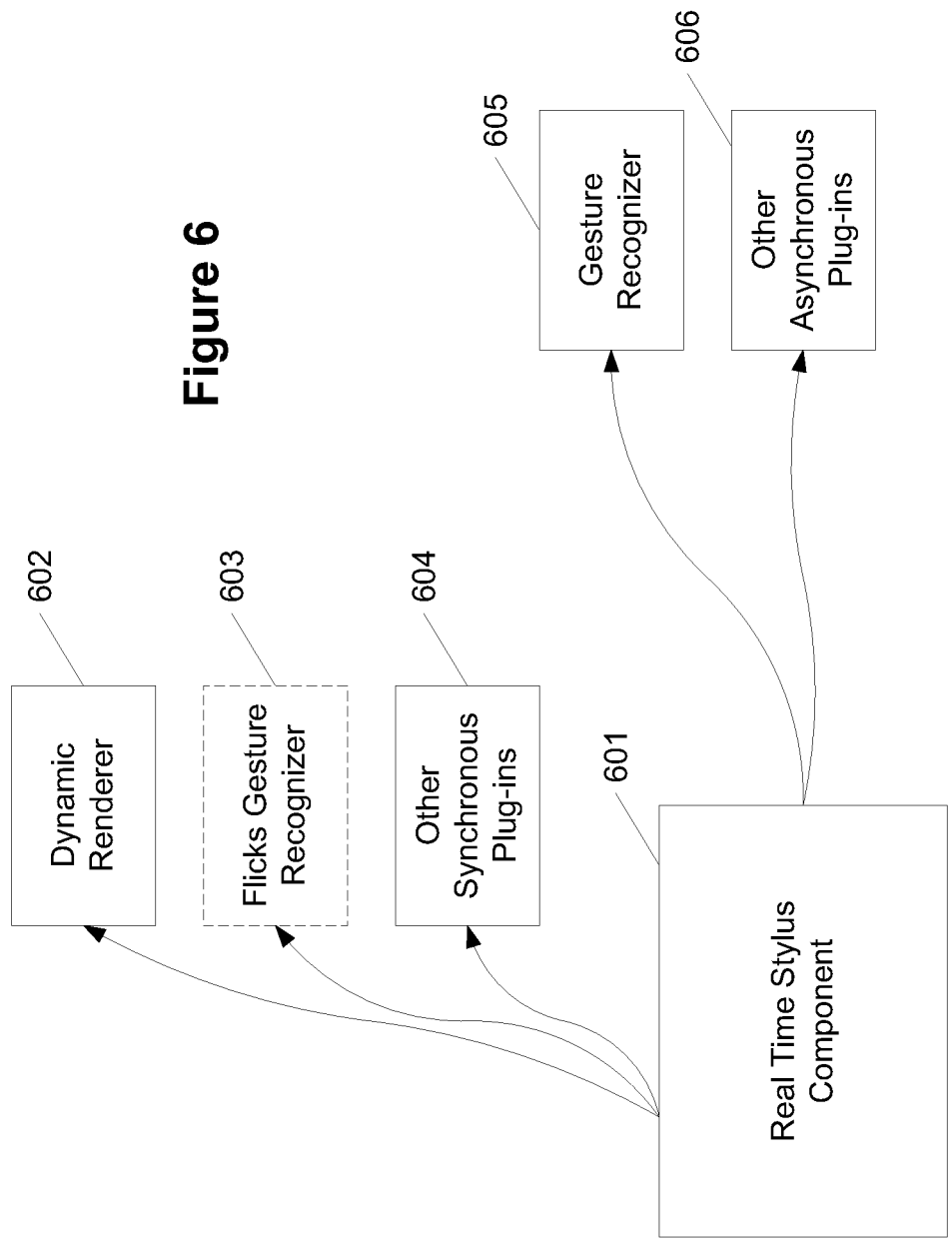
FIG. 6 shows various illustrative components that may be used with a gesture recognizer in accordance with aspects of the present invention.

FIG. 6 shows illustrative examples of how gesture recognizers may be integrated with other components. FIG. 6 shows a real time stylus component 601 which may attempt to process input from a stylus or other input device in real-time.

The real time stylus (RTS) is an object that provides real time stylus events on a given window handle within a given window input rectangle. The real time stylus can also be considered as a framework to which to add plug-in objects that handle additional functions. The plug-in objects may be added and removed as the desired functionality of the real time stylus changes. The real time stylus may have one or more interfaces. In the case of two interfaces, these may be a synchronous interface and an asynchronous interface. These interfaces provide locations to which plug-ins may be connected to the real time stylus. These interfaces are for illustrative purposes only. Other interfaces may be used as well.

Plug-ins may be attached to the synchronous and asynchronous interfaces. A plug-in is a functional component that may be added to the real time stylus object. If a plug-in is attached to a synchronous interface of the real time stylus object, it may be referred to as a synchronous plug-in. If a plug-in is attached to an asynchronous interface of the real time stylus object, it may be referred to as an asynchronous plug-in.

The plug-ins may be grouped into collections. A collection of plug-ins, in one or more groups, that are attached to the RTS. Where two collections exist, they may be associated with the synchronous and asynchronous interfaces of the RTS, respectively. Each collection may be executed in order. Where two or more collections exist, they may be executed independent of each other because they may be attached to different interfaces of the RTS (or RTSs). Data return to the RTS after being handled by each plug-in. The order of plug-ins in the collection may affect the output of the collection.

Real time stylus component 601 may include synchronous plug-ins 602-604 and asynchronous plug-ins 605-606. The plug-ins may be grouped into plug-in collections. The synchronous plug-ins 602-604 (including for example a dynamic renderer) relate to plug-ins that need to quickly process input. Asynchronous plug-ins 605-606 relate to plug-ins on an asynchronous thread of the real time stylus 601. The asynchronous plug-ins 605-606 may process information from the real time stylus on an asynchronous basis.

A flick gesture recognizer may be placed in gesture recognizer 605 and processed on the asynchronous thread. Alternatively, the flick gesture recognizer may be placed on the synchronous thread with other synchronous plug-ins. When placed on the synchronous thread, the flick gesture recognizer 603 is able to quickly process input from real time stylus 601 prior to that information being processed by additional plug-ins and sent to the asynchronous thread. Gestures not recognized as flick gestures should be recognized by the gesture recognizer 605 on the asynchronous thread.

The present invention has been described in terms of preferred and exemplary embodiments thereof. Numerous other embodiments, modifications and variations within the scope and spirit of the appended claims will occur to persons of ordinary skill in the art from a review of this disclosure.

The invention claimed is:

1. A method for recognizing a gesture created by a pointing device, comprising:
   determining a starting point of a stroke;
   determining a center of a circle that corresponds to the starting point;
   determining a plurality of regions associated with the circle, a region of the plurality of regions comprising a sector of the circle and corresponding to an action;
   determining that the stroke ends in the region based at least in part on a determined acceleration of the pointing device during the stroke of the pointing device;
   determining an occurrence of a flick gesture based at least in part on the stroke;
   sending a message, based on the action, about the flick gesture to an operating system or a computing application; and
   causing the action to be performed by the operating system or the computing application.

2. The method of claim 1, wherein the pointing device includes a mouse and determining the occurrence of the flick gesture includes determining that a movement of the pointing device has occurred after an operation of a mouse button.

3. The method of claim 1, wherein the flick gesture is distinct from other gestures.

4. The method of claim 3, further comprising determining that the action to be performed is context-specific based at least in part on at least one of:
   hardware of the operating system;
   a customized action corresponding to the pointing device; or
   a characterization of the stroke based on a direction of the stroke, a movement of the stroke, and a timing of the stroke.

5. The method of claim 1, further comprising determining that the stroke ends in the region based at least in part on determining that a velocity of the pointing device decreased by a predetermined threshold over a predetermined time interval, the predetermined time interval being greater than an interval set to avoid false positives or miss-fired actions.

6. The method as claim 1 recites, further comprising providing animated feedback indicating recognition of the flick gesture.

7. One or more computer storage media having computer-executable instructions that, when executed by a processor, cause the processor to perform operations comprising:
   determining a starting point of a stroke of a pointing device, the starting point corresponding to a contact with a computer-generated display;
   determining a center of a circle that corresponds to the starting point;
   determining a plurality of regions associated with the circle, a region of the plurality of regions comprising a sector of the circle and corresponding to an action;
   determining that the stroke ends in the region based at least in part on a derived value associated with the stroke;
   determining an occurrence of a flick gesture based at least in part on the stroke;
   determining the action based at least in part on a context associated with the flick gesture; and
   providing an indication of a recognition of the flick gesture.

8. The one or more computer storage media of claim 7, wherein the derived value includes at least one of a determined velocity of the stroke, an acceleration of the stroke, a curvature of the stroke, or a lift of the stroke.

9. The one or more computer storage media of claim 7, wherein the action is context-sensitive and customizable to perform a specified function based at least in part on including a first operation performed based at least in part on the flick gesture being performed in a first context of a first application and a second operation different from the first operation that is performed based at least in part on the flick gesture being performed in a second context of a second application different from the first application.

10. The one or more computer storage media of claim 7, wherein the pointing device comprises a mouse and the contact includes operation of a mouse button.

11. The one or more computer storage media of claim 7, wherein the pointing device includes a stylus and the contact includes contact on, or immediately above, a surface of the computer-generated display.

12. The one or more computer storage media of claim 7, wherein the pointing device includes a user's finger and the contact includes contact on, or immediately above, a surface of the computer-generated display.

13. The one or more computer storage media of claim 7, wherein:
  the operations further comprise determining a straightness of a path of the stroke; and
  determining the occurrence of the flick gesture is based at least in part on the straightness determination.

14. The one or more computer storage media of claim 7, the operations further comprising:
  determining that the starting point of the stroke is not associated with an inkable region; and
  based at least in part on determining that the starting point of the stroke is not associated with the inkable region, determining the occurrence of the flick gesture.

15. A computing system, comprising:
  memory;
  a processor, coupled to the memory, that is configured to perform operations comprising:
    recognizing a flick gesture from a plurality of gestures by:
      determining a starting point of a stroke;
      determining a center of a circle that corresponds to the starting point;
      determining a plurality of regions associated with the circle, a region of the plurality of regions comprising a sector of the circle and corresponding to an action;
      determining that a movement associated with the stroke exceeds a movement threshold;
      determining an acceleration of the stroke based at least in part on the stroke exceeding the movement threshold; and
      determining that the stroke ends in the region based at least in part on the acceleration of the stroke;
      determining the action corresponding to the flick gesture, the action being context-sensitive; and
      providing feedback indicating a recognition of the flick gesture.

16. The computing system of claim 15, the operations further comprising determining that the movement exceeds the movement threshold based at least in part on the movement exceeding the movement threshold within a predetermined time interval that is greater than a brief interval that is set to avoid false positives or miss-fired actions.

17. The computing system of claim 15, the operations further comprising determining a characterization of the stroke to determine the region, the characterization of the stroke being based on at least one of a direction of the stroke, a movement of the stroke, or a timing of the stroke.

18. The computing system of claim 15, the operations further comprising:
  determining that the movement of the stroke does not exceed the movement threshold; and
  based at least in part on determining that the movement of the stroke does not exceed the movement threshold, determining that the stroke is a gesture other than a flick gesture.

19. The computing system of claim 15, the operations further comprising:
  determining that a velocity of the stroke has not decreased to being at or below a predetermined velocity threshold; and
  based at least in part on determining that the velocity of the stroke has not decreased to being at or below the predetermined velocity threshold, determining that the stroke is a gesture other than a flick gesture.

20. The computing system of claim 15, the operations further comprising determining a path of the stroke is relatively straight based at least in part on determining that all points of the stroke lie within a predefined angle from the starting point of the stroke.

* * * * *